United States Patent Office 3,605,525
Patented Sept. 20, 1971

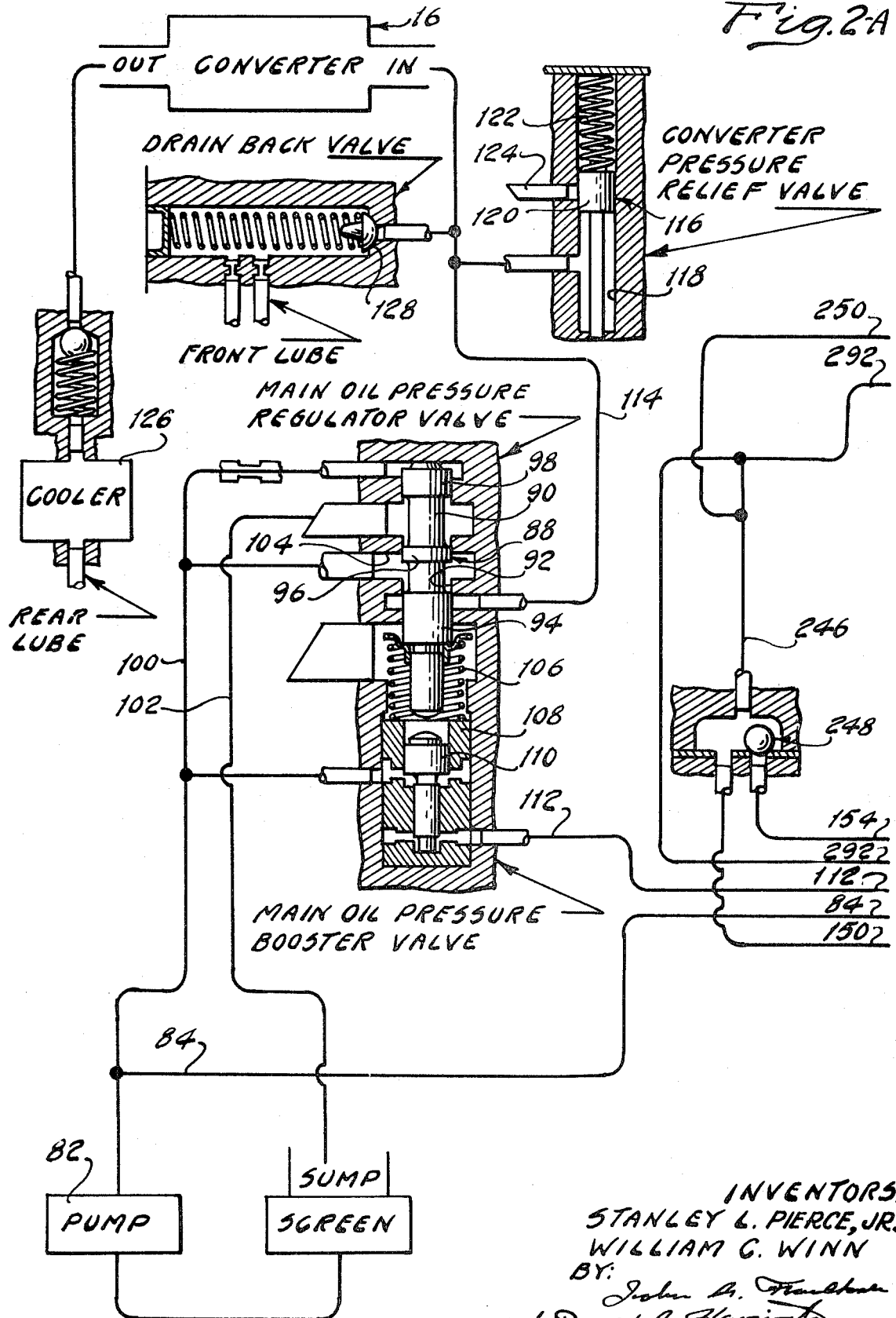

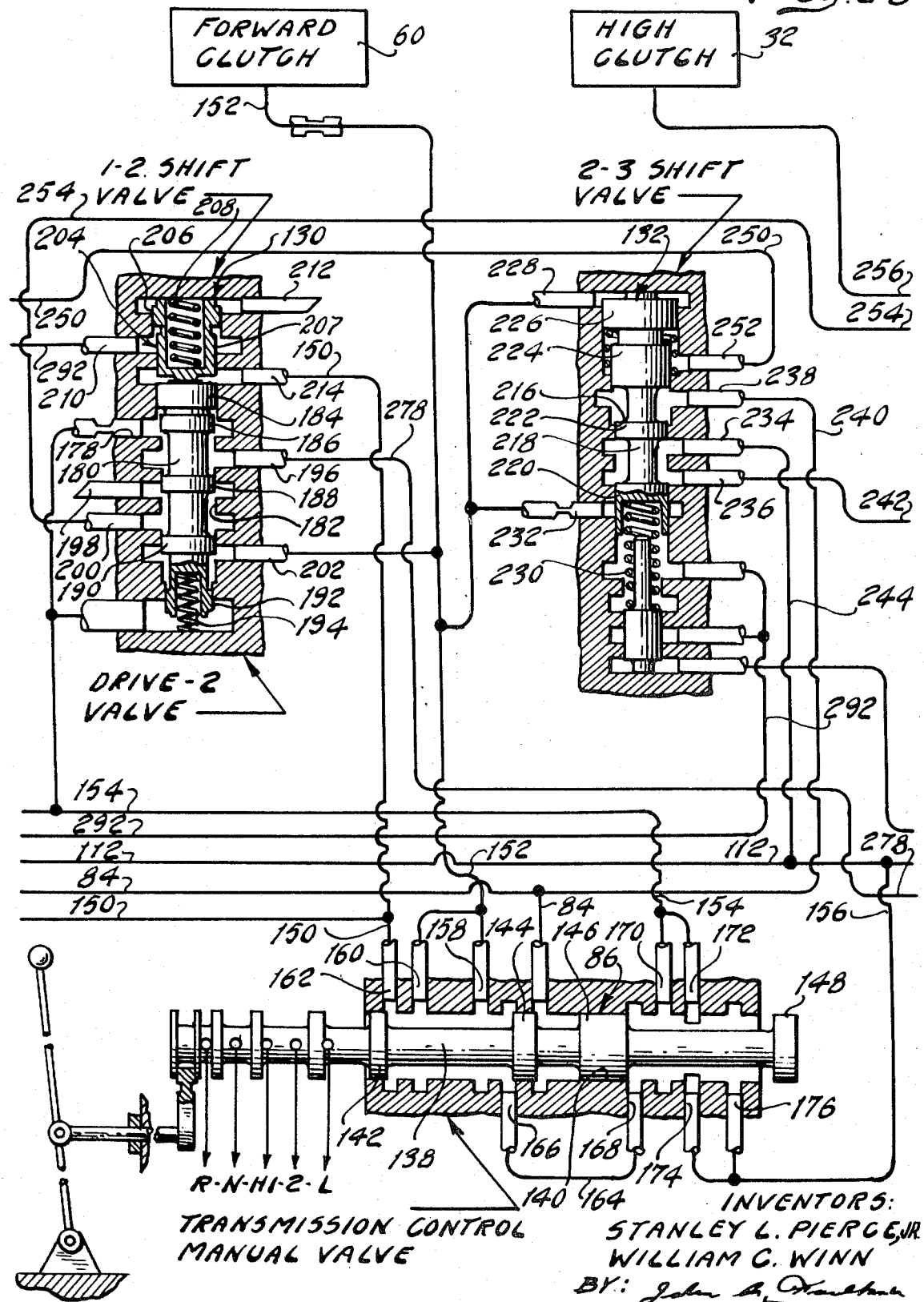

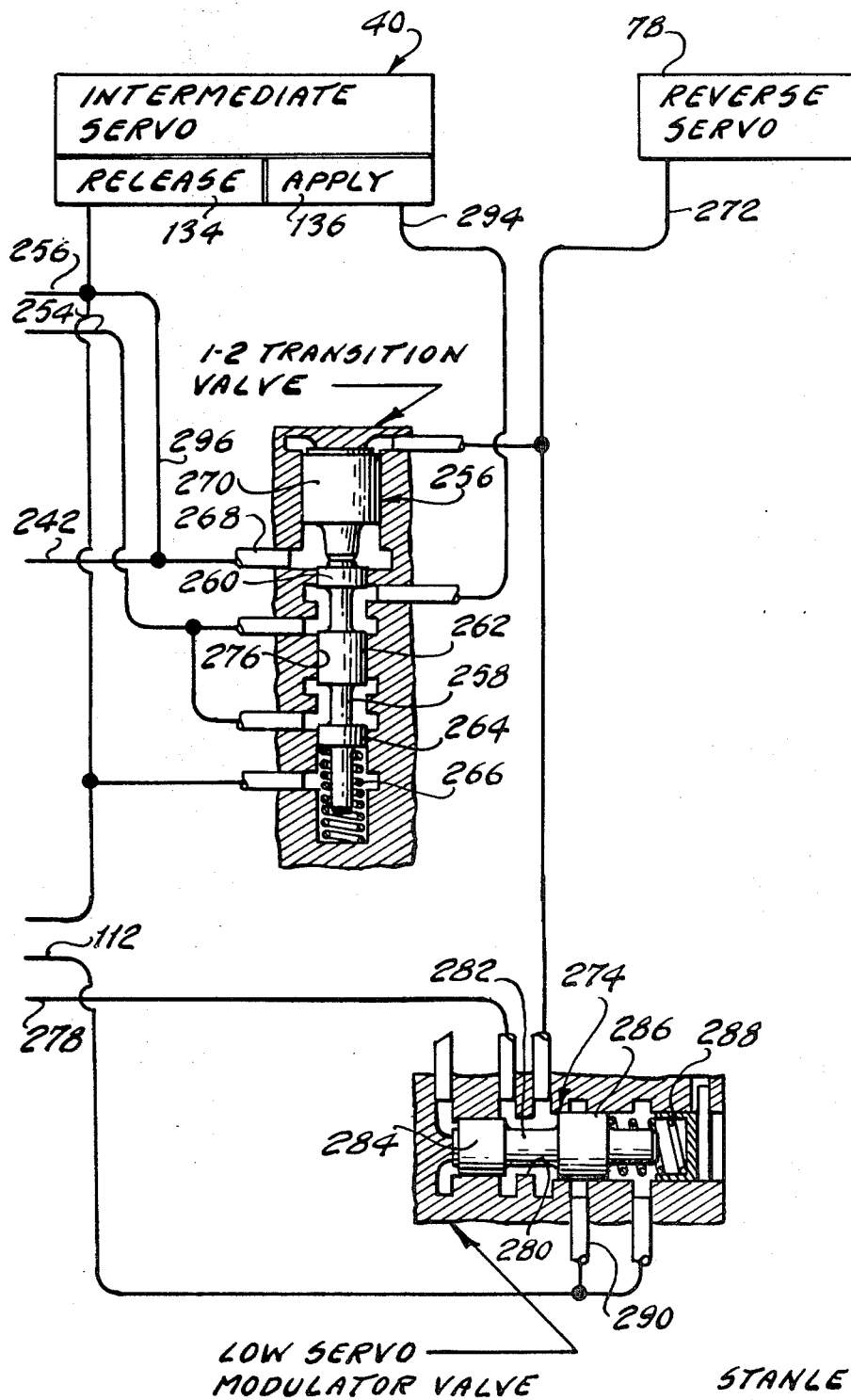

3,605,525
SEMI-AUTOMATIC MULTIPLE SPEED RATIO TRANSMISSION
Stanley L. Pierce, Jr., Birmingham, and William C. Winn, Inkster, Mich., assignors to Ford Motor Company, Dearborn, Mich.
Filed Sept. 8, 1969, Ser. No. 856,528
Int. Cl. F16h *3/44;* B60k *17/10*
U.S. Cl. 74—753                    3 Claims

ABSTRACT OF THE DISCLOSURE

A planetary gear transmission mechanism having a hydrokinetic torque converter, two simple planetary gear units and a semi-automatic ratio control valve system for controlling speed ratio changes in the gear units, said system including simplified shift valve components and timing valve elements for establishing proper shift points as manual transmission ratio selections are made.

GENERAL DESCRIPTION OF THE INVENTION

Our invention comprises a power transmission mechanism for use in an automotive vehicle driveline, and a semi-automatic control valve system for controlling ratio changes. The mechanism includes a hydrokinetic torque converter driven by the vehicle engine, and a compound planetary gear system having two simple planetary gear units which establish plural torque delivery paths between the turbine of the torque converter and the driven shaft, the latter being connected to the traction wheels.

The transmission mechanism includes clutches and brakes which are fluid pressure operated in the usual fashion. Planetary gear units for automotive vehicle drivelines are controlled by automatic ratio changing valve systems which comprise two shift valves, each responding to changes in engine troque demand and vehicle speed to produce automatic ratio changes as driving conditions of the vehicle change. It is an object of our present invention to avoid the complexity of control valve systems of this type by making ratio changes responsive only to manual ratio selection by the vehicle operator. We have provided a valve system that responds to such manual ratio selection while utilizing valve elements that may be useful also in an automatic ratio changing valve system. The mode of cooperation between the common valve elements of the systems, however, is different in our improved valve system than in an automatic valve system.

Our improved and simplified valve system avoids the need for a governor pressure signal for initiating ratio changes. A regulated line pressure signal developed by an engine-driven, positive displacement pump is distributed, in lieu of a governor pressure signal, to ratio changing valve structures. The shifting tendencies imposed on the valves by the regulated line pressure made available to them is opposed by pressure forces created by a regulated line pressure which is distributed to the shift valves through a manual ratio selecting valve.

The two pressures acting on the ratio changing valves oppose each other. When one of the pressures is interrupted, a ratio change occurs because of the continuing influence of the remaining pressure. Ratio changes from a low speed ratio to an intermediate speed ratio are overruled, however, by a transition valve which responds to a low speed ratio brake servo pressure. The influence of that low speed ratio brake servo pressure must be overcome before the ratio changing valve will be permitted to cause an automatic ratio change from a low speed ratio to an intermediate speed ratio.

Our invention is characterized also by a manual ratio changing valve, which controls valve actuating pressure distribution to the shift valves for each ratio change. When this pressure is distributed to the shift valves, it initiates an upshift of one of the valves and a downshift of the other valve. When that same pressure is exhausted through the ratio changing manual valve, the converse occurs. The other shift valves thus assume an upshift position while the first shift valve assumes a downshift position. This action triggers a ratio change to a high speed ratio. As a result of this interaction of the shift valves, the transition valve and the manual valve, a minimum number of valve elements is required in order to accomplish all of the necessary shift functions.

BRIEF DESCRIPTION OF THE FIGURES OF THE DRAWING

FIGS. 2A, 2B and 2C show a schematic control valve system capable of establishing the ratio changing functions in the gear system illustrated in FIG. 1.

PARTICULAR DESCRIPTION OF THE INVENTION

Figure 1:
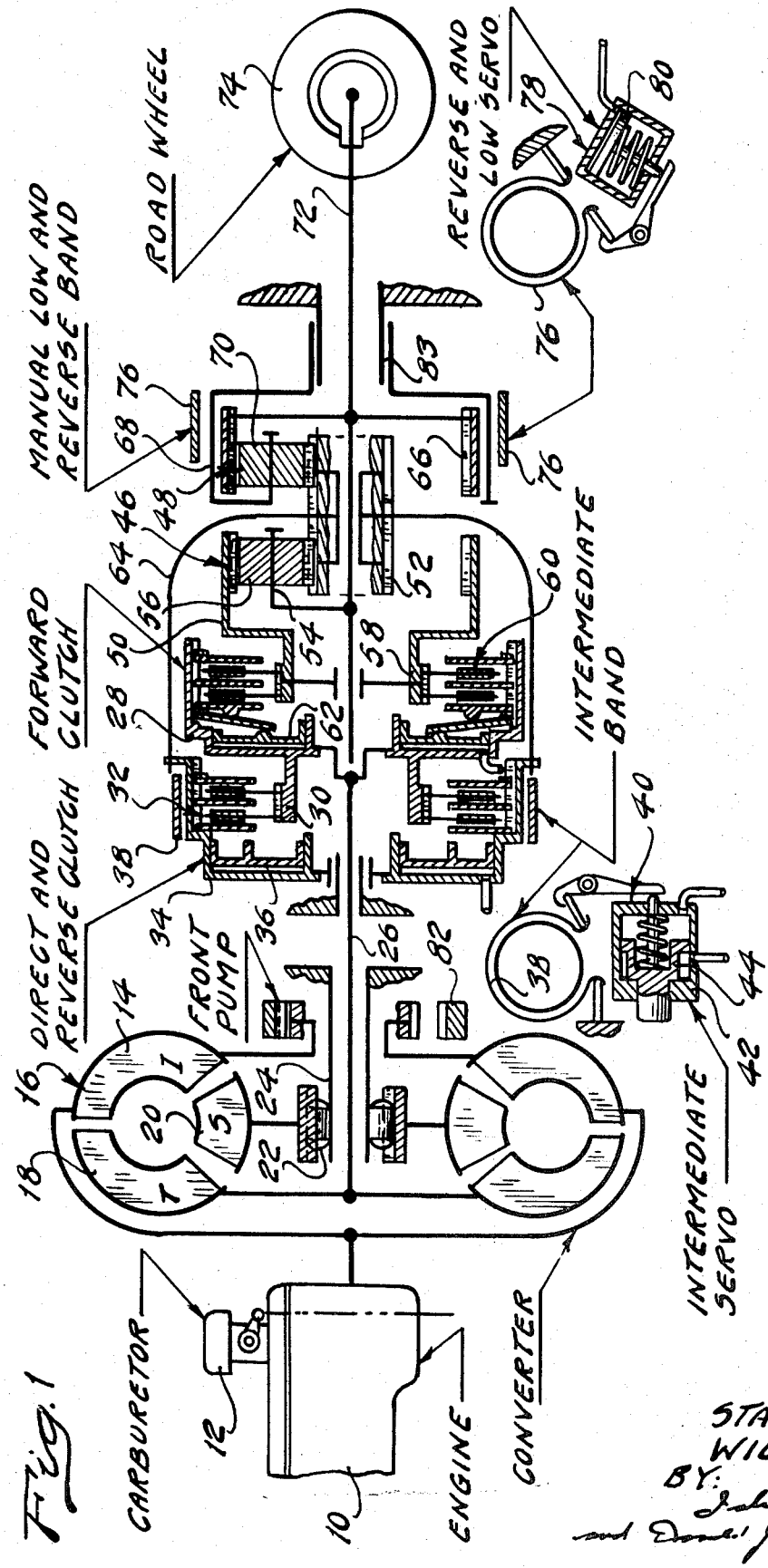
FIG. 1 shows a schematic representation of the torque delivery elements of our improved transmission mechanism.

In FIG. 1, numeral 10 designates an internal combustion engine having an air-fuel mixture intake manifold with a throttle controlled carburetor 12. The engine crankshaft is connected to the impeller 14 of the hydrokinetic torque converter 16. The converter includes a bladed turbine 18 and a bladed stator 20 arranged in toroidal fluid flow relationship with respect to the impeller 14. A stator 20 includes an over-running brake 22, which permits rotation of the stator 20 during hydrokinetic coupling action in the direction of rotation of the impeller. It prevents rotation of the stator in the opposite direction, the braking torque being accommodated by a stationary stator shaft 24.

The turbine 18 is connected to turbine shaft 26, which is drivably connected to clutch drum 28. This drum carries an externally splined clutch element 30, which forms a part of a direct-and-reverse clutch. Externally splined clutch disc assembly 32 is carried by clutch drum 34 journaled on a stationary portion of the transmission housing. This drum defines an annular cylinder within which an annular piston 36 is received. Brake band 38 surrounds drum 34 and is applied and released by an intermediate servo shown generally at 40. Servo 40 includes a cylinder 42 having a piston 44 which cooperates with the cylinder to define a pair of opposed fluid pressure chambers. These are indicated in the schematic representation of FIG. 2C as an intermediate servo release chamber and an intermediate servo supply chamber.

A pair of simple planetary gear units 46 and 48 is situated at the rearward side of the transmission assembly. Gear unit 46 includes a ring gear 50, a sun gear 52, *a* carrier 54 and planetary pinions 56 journaled on the carrier 54. Pinions 56 mesh with ring gear 50 and sun gear 52.

Clutch drum 28 carries externally splined clutch discs, which register with internally splined clutch discs carried by clutch element 58 of a forward clutch disc assembly 60. Clutch drum 28 defines an annular cylinder, which receives an annular piston 62. When fluid pressure is admitted to the working chamber defined in part by the piston 62, clutch drum 28 becomes connected drivably to the ring gear 50. Similarly, when fluid pressure is admitted to the working chamber defined in part by the piston 36, shaft 26 becomes drivably connected to clutch drum 34. This drum 34 is drivably connected by means of a drive shell 64 to the sun gear 52.

Gear unit 48 includes ring gear 66, planet carrier 68 and planet pinions 70, the latter being journaled on the carrier 68 in meshing engagement with the ring gear 66 and the sun gear 52. Both planetary gear units 48 and 46 use a common sun gear.

Carrier 54 is connected drivably to power output shaft 72. Ring gear 66 also is connected to power output shaft 72, which in turn is connected to the road wheels 74 through a suitable driveline and differential-and-axle assembly.

A brake band 76 surrounds the carrier 68 and is engaged during operation in the low speed ratio and during reverse drive. Brake band 76 is applied and released by a fluid pressure operated servo 78, which comprises a cylinder and a fluid pressure operated piston 80. Carrier 68 is journaled rotatably in a portion 83 of the transmission housing structure.

During operation in the low speed ratio, brake band 76 is applied. Forward clutch disc assembly 60 also is applied, as it is during operation in either of the other two forward driving speed ratios. Engine torque is delivered to the impeller 14. Converter 16 hydrokinetically multiplies the impeller torque producing a turbine torque, which is distributed through the turbine shaft 26 and through the engaged clutch disc assembly 60 to the ring gear 50. A forward driving torque is applied to the output shaft 72 through the carrier 54. A parallel torque delivery path is established as the sun gear 52 drives the pinions 70, which are anchored by the brake band 76 for the carrier 68. The pinions 70 cause the ring gear 66 to be driven in the direction of rotation of the sun gear 52 so that the ring gear torque will complement the torque acting on the carrier 54.

To establish intermediate speed ratio operation, brake band 38 is applied thereby anchoring the sun gear 52 so that it functions as a reaction point. Brake band 76 is released, and turbine torque is delivered through the clutch 60 to the ring gear 50. The planetary gear unit 46 multiplies the input torque causing carrier 54 to act as an output member.

High speed ratio operation is achieved by engaging simultaneously both clutches while both brakes are disengaged. The elements of the planetary gear units thus rotate in unison with a 1:1 speed ratio.

Reverse drive is achieved by engaging clutch disc assembly 32 and disengaging clutch disc assembly 60. Brake band 76 is applied. Torque now is delivered directly to the sun gear 52 through the engaged clutch disc assembly 32. With the carrier 60 acting as a reaction point, the ring gear 66 and the output shaft 72 are driven in a reverse direction.

A simplified, semi-automatic control valve system for controlling the previously described clutch-and-brake engagement and release pattern is illustrated in FIGS. 2A, 2B and 2C. In FIG. 2A, the front pump is schematically designated by reference character 82. It is driven as indicated in FIG. 1 by the torque converter impeller 14. The output pressure of the pump 82 is received by control pressure line 84, which extends to transmission control manual valve 86.

The pressure in passage 84 is regulated by main oil pressure regulator valve 88, which comprises a valve spool 90 slidably situated in regulator valve chamber 92. Valve element 90 includes spaced valve lands 94, 96 and 98, which register with cooperating internal valve lands formed in the valve chamber 92. Passage 84 communicates with valve 88 through passage 100, which extends to the upper side of the land 98. An exhaust passage 102, which extends to the transmission sump, communicates with the valve chamber 92 at a location intermediate the valve lands 96 and 98. Passage 100 communicates with the chamber 92 through port 104. Land 96 controls the degree of communication between port 104 and exhaust passage 102. The force produced on the land 98 opposes the force of the valve spring 106.

At the lower end of the valve chamber 92 is situated a valve sleeve 108 within which is positioned a movable spool 110 having lands of differential areas. The differential areas formed by these lands is in communication with passage 100.

The regulating characteristics of the valve 88 can be controlled by altering the relationship of the differential area on the spool 110 and the land 98, as well as by choosing the proper calibration of the spring 106. The lower end of the valve spool 110 is in fluid communication with passage 112, which is pressurized whenever the manual valve 86 is conditioned for reverse drive operation as will be explained subsequently. This produces an increase in the effective operating pressure level maintained by the valve 88 since the pressure in passage 112 complements the force of the spring 106.

The torque converter 16 is supplied with fluid pressure through a converter feed passage 114, which communicates with the main oil pressure regulator valve 88 at a location directly adjacent land 94. During initial operation of the pump 82 a pressure buildup occurs in passage 100. During the time the land 96 uncovers the exhaust port communicating with passage 102, the passage 114 is uncovered by the land 94. This assures a supply of fluid pressure to the converter.

A converter pressure relief valve 116 limits the maximum pressure that can be made available to the converter 16. It comprises a valve chamber 118 within which is slidably disposed a single diameter valve element 120, which is urged toward one end of the chamber 118 by valve spring 122. Exhaust port 124 communicating with the chamber 118 is uncovered by the valve element 120 when the pressure in passage 114 is sufficient to urge the element 120 against the force of spring 122.

The discharge side of the converter 16 passes through an oil cooler 126 and hence to the rear lubrication system of the transmission mechanism. The front lubrication system for the transmission mechanism communicates with the passage 114 through a one-way fluid valve 128. This valve functions to prevent the drain-back of fluid from the converter 16 to the lube system when the pump 82 is inactive. Thus the converter can be maintained filled when the transmission is idle.

The control system includes a pair of shift valves identified in FIG. 2B as the 1–2 shift valve 130 and the 2–3 shift valve 132. These valves are located in the conduit structure that connects the clutch and brake servos with the pump 82. For clarity, the servos have been identified in FIGS. 2B and 2C by reference characters that are similar to the reference characters used in FIG. 1 to identify the clutch and brake servo assemblies. The servo 40 includes a pair of working chambers, which are separately identified in FIG. 2C by reference characters 134 and 136, the former being a release pressure chamber and the latter being an apply pressure chamber. Pressure is distributed to the valves 130 and 132 by the transmission control manual valve 86, which is located in series with these valves with respect to the pump 82.

Valve 86 includes a multiple land valve spool 138, slidably situated in valve chamber 140. Valve element 138 comprises valve lands 142, 144, 146 and 148. Passage 84 communicates with the chamber 140 at a location intermediate the lands 144 and 146 when the valve element 138 is in the neutral position. The other operating positions of element 138 are identified by reference characters R, Hi, 2 and L which respectively refer to reverse drive, high speed ratio drive, intermediate speed ratio drive and low speed ratio drive.

Each end of the chamber 140 serves an an exhaust port. A plurality of passages, in addition to the passage 84, communicate with the chamber 140. These passages are simply identified by reference characters 150, 152, 154 and 156. Passage 152 communicates with two adjacent ports 158 and 160 in the chamber 140. Passage 150 communicates with a single port 162. A crossover passage 164 communicates with separate ports 166 and 168. Passage 154 communicates with adjacent ports 170 and 172.

Finally, passage 156 communicates with each of two adjacent ports 174 and 176.

The various passages associated with the manual valve are selectively pressurized as the element 138 is adjusted manually. When the element 138 assumes the neutral position shown, communication between passage 84 and the other passages is interrupted by the lands 144 and 146. Each of the other passages 150, 152, 164 and 156 at that time communicate with the exhaust through the right hand end of the chamber 140. When the manual valve element 138 is shifted to the reverse position R, communication is established between passages 84 and 164, which in turn communicate with each of the passages 154 and 156. These latter two passages then become pressurized when the transmission is conditioned for reverse drive operation. Passages 150 and 152 at that time are exhausted through the left hand end of the valve chamber 140.

When the manual valve element 138 is shifted to the "Hi" position, passage 152 is brought into fluid communication with passage 84. Passage 150 becomes exhausted through the left hand end of the valve chamber 140, and passages 154 and 156 become exhausted through the right hand side of valve chamber 140. Passage 152 is pressurized whenever the manual valve element is shifted to a forward driving position.

If the manual valve element 138 is shifted to the "2" position, passages 154 and 156 continue to be exhausted through the right hand end of the valve chamber 140. Passage 152, however, now is brought into fluid communication with passage 150 through the ports 160 and 162. Passage 84 pressurizes passage 152 as indicated earlier.

When the manual valve element 138 assumes the "L" position, passage 150 is exhausted through the left hand end of the valve chamber 140. Passage 156 is exhausted through the right hand end of the valve chamber 140. Passage 154, however, is brought into fluid communication with passage 164, which in turn communicates with passage 84. Passage 152 continues to be supplied with fluid pressure from passage 84.

Passage 154 extends to the 1–2 shift valve 130 and communicates with port 178. Valve 130 comprises a movable land valve spool 180 slidably situated in valve chamber 182. Element 180 has spaced valve lands 184, 186, 188, 190 and 192. It is urged in an upward direction by valve spring 194. When these lands register with internal valve lands formed on the chamber 182, port 178 is located adjacent lands 186 and communicates with port 196 when valve element 180 assumes the position shown in FIG. 2B. Port 196 communicates with exhaust port 198 when the valve element 180 moves downwardly. Port 198 communicates with port 200 when the valve element 180 assumes the position shown. Port 202, adjacent land 190, is blocked as shown when the valve element 180 assumes the position shown, but it is brought into communication with port 200 when the valve element 180 shifts downwardly.

A valve spool 204 is slidably situated in the upper end of the chamber 182. It is formed with lands 206 and 207 having a differential area, which area is in fluid communication with port 210. Valve spring 208 acts on spool 204 tending normally to urge it into engagement with the valve element 180. The lower end of the land 207 and the upper end of the land 184 are pressurized with fluid admitted to the valve chamber through port 214. This port is in direct communication with the passage 150 and is pressurized whenever the manual valve is shifted to the intermediate speed ratio position.

Passage 152 communicates with port 202 as well as with the 2–3 shift valve 132.

Valve 132 includes a valve chamber 216 and a movable valve element 218 in the chamber 216. Valve element 218 includes spaced valve lands 220, 222, 224 and 226. The upper end of the land 226 communicates with port 228 which is supplied with fluid pressure from passage 152. Valve element 218 is urged in an upward direction as viewed in FIG. 2B by valve spring 230. Port 232 communicates with the valve chamber 216 adjacent land 220. Ports 234 and 236 communicate with the valve chamber 216 at a location intermediate the lands 220 and 222 when the valve element 218 is positioned as shown. When the valve element 218 is moved downwardly, communication is established between port 236 and port 232, and communication between ports 236 and 234 is interrupted. At that time, however, port 238, which normally is in communication with the control pressure line 84 through passage 240, is blocked by land 224 and the fluid pressure that acts on the differential area of lands 232 and 224 is sealed off as this area communicates with port 234. This port is exhausted for every position of the manual valve except the reverse drive position.

When the shift valve 218 moves downwardly, port 232 is brought into communication with port 236. This establishes communication between passage 152 and a passage 242, the latter communicating with high clutch 32. When the valve element 218 is in the position shown, the high clutch is exhausted because of the fluid connection established between ports 234 and 236, the latter communicating with exhausted passage 156 through passage 244.

Passage 150 is in fluid communication with a passage 246 through two-position check valve 248. Passage 246 in turn communicates with port 210 in the 1–2 shift valve assembly and with passage 250, which extends to port 252 in the 2–3 shift valve 132, thereby permitting fluid pressure to act on the differential area of lands 224 and 226. The two-position check valve 248 provides communication also between passage 154 and pasage 246 when the manual valve is in the low or reverse position.

Passage 152, which communicates with port 202, is brought into fluid communication with port 200. When the 1–2 shift valve moves downwardly, port 200 communicates with passage 254, which in turn communicates with the 1–2 transition valve 256. This includes a valve element 258 with lands 260, 262 and 264. Valve element 258 is urged upwardly, as viewed in FIG. 2C, by a valve spring element 266. Passage 242, which extends to the high speed ratio clutch 32 communicates with the upper end of the land 260 through port 268. A relatively large diameter valve element 270 is coaxially arranged with respect to the valve element 258, and it also is subjected to the pressure in port 268, which normally tends to urge it in an upward direction as viewed in FIG. 2C. The upper end of the valve element 270 is in fluid communication with passage 272 extending toward the rear servo 78. Passage 272 is supplied with modulated pressure from low servo modulator valve 274.

When the valve element 258 is positioned as shown, communication is established between passage 254 and passage 294 through the valve chamber 276, which receives the valve element 258.

The low servo modulator valve 274 communicates with passage 278, which extends to port 196 and the 1–2 shift valve assembly 130. This port is pressurized whenever the valve element 180 is in an upward position and the manual valve is in the lower position. Passage 278 distributes pressure to low servo modulator valve chamber 280, which receives a valve element 282 having differential diameter lands 284 and 286. Valve spring 288 urges the element 282 in a left hand direction. The pressure force exerted on the differential area of lands 284 and 286 normally tends to urge the element 282 in a right hand direction, thereby increasing the degree of communication between passage 272 and the exhaust port 290 and tending to decrease the degree of communication between passage 278 and passage 272. This results in a reduced or modulated pressure in passage 272. The amount of the modulating action that occurs can be calibrated so that the reverse servo is engaged with a desired pressure. This avoids harshness or roughness in the engagement of the servo 78 due to the excessive pressure level that exists in the high pressure region of the control circuit.

When the manual valve 86 is conditioned for low speed ratio operation, passages 152 and 154 are pressurized. Pressure is distributed at that time to the lower end of the 1–2 shift valve assembly because of the fluid connection between passage 154 and the lower end of the valve chamber 182 thus overruling the force of spring 208. This causes the 1–2 shift valve assembly to assume an upward position. Similarly, both ends of the 2–3 shift valve assembly are hydraulically loaded since the port 228 is in fluid communication with pressurized passage 152 and because passage 292 is in fluid communication with pressurized passage 154 through the two position check valve 248. Passage 292 in turn communicates with the spring chamber for spring 230. The differential area on lands 226 and 224 also is pressurized with the pressure in passage 250, which also communicates with pressurized passage 246.

Since both shift valves are in an upward position at this time, it is possible for control pressure to be distributed directly from passage 154 through the ports 178 and 196 to passage 278, which supplies the low servo modulator. The forward clutch and the low-and-reverse servo then are applied as a low-speed driving condition is established.

To effect an upshift to the intermediate ratio, the manual valve is shifted to the 2 position. At that time, passage 150 becomes pressurized as explained previously. Passage 152, of course, remains pressurized. Passage 154 now becomes exhausted while the pressure on the upper end of the 1–2 shift valve assembly remains at a high value. Because an unbalance now exists across the 1–2 shift valve assembly, the 1–2 shift valve will move in a downward direction thereby causing port 196 to be exhausted through the port 198. This causes the reverse servo to become disengaged. At the same time, the pressurized port 202 is brought into engagement with port 200, thereby pressurizing passage 254. Pressure then is distributed through the transition valve to passage 294, thus applying the intermediate servo. This shift cannot occur, however, until reverse servo 78 is exhausted since the pressure in the reverse servo maintains the transition valve in a downward direction until the servo has been released. It is impossible, therefore, to engage simultaneously the reverse servo and the intermediate servo.

Although the lower end of the 1–2 shift valve assembly is exhausted, the lower end of the 2–3 shift valve assembly remains pressurized since passage 292 continues to communicate with the pressurized passage 150. If the manual valve is shifted to the high position, however, passage 150 becomes exhausted as well as passage 154. The pressure acting in the spring chamber for spring 230 thus is relieved and the continuing pressure acting on the upper end of the land 226 will cause the valve element 218 to shift downwardly. This causes direct communication between pressurized port 232 and clutch feed passage 296 extending to the high clutch 32. Passage 296 communicates with pressurized passage 242 as indicated in FIGS. 2B and 2C.

The pressure on the release side of the intermediate servo is applied to both the upper end and the lower end of the valve element 258 so that the effect of one pressure force is balanced by the other.

During reverse drive, communication is established between pressurized passage 244 and the passage 242 through the adjacent ports 234 and 236 of the 2–3 shift valve assembly. This causes pressure to be distributed directly to the clutch 32. Pressure also is distributed from pressurized passage 154 and through the ports 178 and 196 to the passage 278. This causes reverse servo 78 to be pressurized along with the clutch 32, thus establishing a reverse drive condition.

The ratio shifts that are obtained in the foregoing fashion are entirely under the control of the operator since there are no automatic control responses that depend upon engine torque or vehicle speed. The shift sequences result from the selective control of the pressure forces acting on either side of the two shift valve assemblies. Each shift results from a predictable response of the valve assemblies to movement of the manual valve. The possibility of an undesired overlap between the engagement and release of the clutches and brakes is eliminated. Furthermore, these functions are accomplished with a minimum number of valve elements in comparison to semi-automatic transmissions of known design.

Having thus described the preferred form of our invention, what we claim and desire to secure by U.S. Letters Patent is:

1. A multiple ratio power transmission mechanism comprising a power input member, a power output member, multiple ratio planetary gearing having gear elements that establish plural torque delivery paths between said driving member and said driven member, clutch and brake means for controlling the relative motion of said gear elements to condition said mechanism for operation in any selected ratio, fluid pressure operated servos for engaging and releasing said clutch and brake means, a pressure source, a pair of shift valves, a manual selector valve, said selector valve being in fluid communication with said pressure source, plural pressure distribution passages extending from said selector valve to each of said shift valves, supply passages extending from said shift valves to said servos, each shift valve having two operating positions, each shift valve, upon assuming a first of its operating positions, establishing fluid communication with a first pair of said servos through said selector valve to establish a low speed ratio drive condition, said selector valve, when it is so conditioned for low speed ratio operation, distributing pressure from said source to each said shift valve thereby maintaining pressure forces thereon causing them to assume their respective first positions, said selector valve upon assuming a second position exhausting one side of a first of said shift valves to interrupt pressure delivery to one of said pair of servos while distributing pressure therethrough to another servo whereby a different pair of servos is engaged to effect intermediate speed ratio operation, said selector valve, upon assuming a third operating position, exhausting pressure from one side of the second shift valve thereby allowing the latter to move to a different pressure distributing position and establishing a pressure distribution path between said source and a third servo to effect simultaneous engagement of a third pair of servos to condition said mechanism for a high speed ratio operation.

2. A multiple ratio power transmission mechanism comprising a power input member, a power output member, multiple ratio planetary gearing having gear elements that establish plural torque delivery paths between said driving member and said driven member, clutch and brake means for controlling the relative motion of said gear elements to condition said mechanism for operation in any selected ratio, fluid pressure operated servos for engaging and releasing said clutch and brake means, a pressure source, a pair of shift valves, a manual selector valve, said selector valve being in fluid communication with said pressure source, plural pressure distribution passages extending from said selector valve to each of said shift valves, supply passages extending from said shift valves to said servos, each shift valve having two operating positions, each shift valve, upon assuming a first of its operating positions, establishing fluid communication with a first pair of said servos through said selector valve to establish a low speed ratio drive condition, said selector valve, when it is so conditioned for low speed ratio operation, distributing pressure from said source to each shift valve thereby maintaining pressure forces thereon to urge it to its acting first position, said selector valve upon assuming a second position exhausting one side of a first of said shift valves to interrupt pressure delivery to one of said pair of servos while distributing pressure therethrough to another servo whereby a different pair of servos is engaged to effect intermediate speed ratio operation, said selector valve, upon assuming a third operating position, exhausting pressure from one side of the second shift valve thereby allowing the latter to move to a different pressure distributing position and establishing a pressure distribution path between said source and a third servo to effect simultaneous engagement of a third pair of servos to condition said mechanism for a high speed ratio operation, and transition valve means situated in the supply passages located between said shift valves and the servos for low speed operation and intermediate speed operation, said transition valve means including a movable valve element establishing fluid communication between said pressure source and said intermediate servo when the pressure in said low servo acting on said transition valve means is interrupted, fluid communication with said intermediate servo being interrupted when the pressure in said low servo is greater than a precalibrated value.

3. A semi-automatic power transmission mechanism for delivering torque from a driving member to a driven member, multiple ratio gearing establishing power torque delivery paths between said driving member and said driven member, clutch and brake means for controlling the relative motion of said gear elements, fluid pressure operated servos for actuating and releasing said clutch and brake means, a pressure source, conduit structure interconnecting said pressure source and said servos, shift valve means situated and partly defining said conduit structure for controlling selectively distribution of pressure to said servos when the speed ratio changes, a transmission manual selector valve in said conduit structure situated between said pressure source and said shift valve means, pressure passages interconnecting said selective valve and said shift valve means, said selector valve having multiple operating positions for selectively pressurizing and exhausting said passages whereby actuating pressures are distributed selectively to either side of said shift valve means thereby initiating shifting movements of the latter as movements of said selector valve are made, and transition valve means for overruling the tendency of said shift valve means to initiate ratio change from a low ratio to a higher speed ratio, said transition valve means being subjected to the pressures made available to said low speed ratio servo, said transition valve means moving to a pressure distributing position between said shift valve means and the servo for said higher speed ratio when the servo pressure force of the low ratio servo is reduced to a value less than a predetermined minimum.

References Cited
UNITED STATES PATENTS 3,212,360 10/1965 Fisher et al. _____ 74—731
3,459,071 8/1969 Schaefer _____ 74—758

ARTHUR T. McKEON, Primary Examiner

U.S. Cl. X.R.

74—869, Digest 1